United States Patent [19]

McKee

[11] 4,066,796

[45] Jan. 3, 1978

[54] COATING PIZZA PRODUCTS

[75] Inventor: Donald H. McKee, Tampa, Fla.

[73] Assignee: Food Research, Inc., Tampa, Fla.

[21] Appl. No.: 677,836

[22] Filed: Apr. 16, 1976

[51] Int. Cl.² ........................................... A21D 15/08
[52] U.S. Cl. ................................... 426/302; 426/94;
   426/95; 426/303; 426/304; 426/305; 426/310
[58] Field of Search ............... 426/303, 305, 302, 289,
   426/96, 290, 291, 293, 95, 310, 304

[56] References Cited

U.S. PATENT DOCUMENTS

| 2,547,206 | 4/1951 | Hanau | 426/94 |
|---|---|---|---|
| 2,668,117 | 2/1954 | Bucci | 426/62 |
| 3,395,024 | 7/1968 | Earle | 426/291 |
| 3,667,963 | 6/1972 | Katter et al. | 426/293 |

*Primary Examiner*—Joseph M. Golian
*Attorney, Agent, or Firm*—Lowe, King, Price & Markva

[57] ABSTRACT

A pizza crust has a surface for receiving food ingredients such as sauce, cheese and the like. An aqueous dispersion containing water-soluble algin is applied to the food ingredient receiving surface. An aqueous gelling solution is applied to the algin-coated pizza crust for a period of time sufficient to form a substantially continuous edible algin-containing film along the food ingredient receiving surface. The film is sufficient to effectively retard the migration of material from food ingredients placed on the food ingredient receiving surface. A second algin-containing film is formed over the ingredients in the same manner as the first film was formed on the pizza crust. The algin-containing film used with the pizza is sufficient to retard dehydration from both the pizza crust and the food ingredients. The film is effective to reduce breaking and splitting of the pizza to improve the transportability thereof. The film is sufficient to constitute an oxygen barrier for retarding oxidation to prevent ingredients highly susceptible to oxidation from becoming rancid. The film is sufficient to hold the food ingredients physically in place on the pizza crust while the pizza is subjected to subsequent processing steps. Finally, the film is sufficient to retain flavors within the pizza during cooking thereof.

19 Claims, No Drawings

COATING PIZZA PRODUCTS

BACKGROUND OF THE INVENTION

This invention relates to the preparation of a dough product such as a pizza. More particularly, it is directed to the processing of a pizza crust which may be subjected to a multiplicity of steps including precooking, ingredient receiving, quick freezing, packaging and handling.

Convenience food processing is an extremely large industry. Shelf life is a most important aspect of a convenience food. Foods must retain their color, moisture content and general palatability over extended periods of time. This is particularly true with respect to pizza. Pizza is sold in various ways. The pizza shell or crust may be manufactured and sold to the individual consumer or to another processor who places ingredients thereon. The completed pizza may be partially cooked, uncooked or completely cooked followed by a freezing step.

Quick-freezing apparatus is used to produce frozen pizza bearing food ingredients. The substantial velocity of air in such apparatus will blow off many of the ingredients such as grated cheese, oregano, parsley, pepperoni, anchovies, shrimp, and the like. This produces a substantial economic loss with respect to the processing of the frozen pizza. The food ingredients which have been blown from the crust to the floor or conveyor cannot be reused. Further, there is significant dehydration of the pizza crust and the food ingredients.

The food ingredients of any pizza product are subject to oxidation. For example, ingredients such as pork sausage, pepperoni and anchovies are highly susceptible to oxidation and consequently, rancidity.

Finally, shrinkage, flavor loss, and scorching can be very troublesome during the cooking of known pizza products. Spices are very volatile and lose their strength both in storage and in the cooking process. Shrinkage is caused when the various portions of the pizza product are dehydrated.

U.S. Pat. No. 2,668,117 exemplifies the prior art. Here a tomato product is placed on a pizza crust. Subsequently, the coated pizza crust is treated to coagulate or coalesce the tomato product on the surface of the dough. The food ingredients are then placed over the film of tomato sealing agent. Thus, any unwanted moisture may not penetrate the dough crust. There must be an interaction of the sealing agent with the dough product. The various other problems of dehydration, breaking and splitting, oxidation, food loss during freezing and general shelf life of the product have not been overcome.

PURPOSE OF THE INVENTION

The primary object of the invention is to provide a dough product with a protective coating which is effective to retard dehydration and reduce breaking and splitting of the dough product to improve the transportability thereof.

A further object of the invention is to provide an edible protective film that is sufficient to constitute an oxygen barrier for retarding oxidation to prevent ingredients highly susceptible to oxidation from becoming rancid.

Another object of the invention is to rovide a protective, edible film on a dough product which will retain flavors within the product during cooking and be sufficient to effectively retard the scorching of the dough product during a cooking step.

A still further object of the invention is to provide a protective, edible film over the food ingredients on a pizza crust that is sufficient to hold the food ingredients physically in place on the crust to prevent inadvertent removal thereof during a quick-freezing processing step.

A still further object of the invention is to provide a dough product having the characteristics of an extended shelf life compared to dough products available heretofore.

SUMMARY OF THE INVENTION

These objects and other advantages are obtained through the use of the process described herein. An aqueous dispersion containing water-soluble algin is prepared and applied to the surface of a shaped dough product. An aqueous gelling solution is then applied to the algin-coated product for a period of time sufficient to form a substantially continuous edible algin-containing film along a surface thereof.

A feature of this invention is the processing of a pizza. The algin-containing film may be applied either before or after a prebaking step without losing the various advantages associated with the disposition of such a coating.

A further feature of this invention is directed to the processing of a pizza having food ingredients disposed thereon. There is a particular problem of having the migration of moisture from the food ingredients into the dough of the crust. An algin-containing film is placed over the food ingredient receiving surface on the crust. The food ingredients are then placed onto the crust over the protective film. The film is sufficient to effectively retard the migration of material from the food ingredients placed on the food ingredient receiving surface into the dough crust.

Another feature of the invention is to place a protective, edible algin-containing coating over the food ingredients after they are placed on the pizza crust. This is particularly useful when the objective is to form a frozen pizza. During the freezing process, high air velocities are encountered. The film is sufficient to physically hold the food ingredients on place on one surface of the pizza crust during the freezing process. When a first protective film is placed on the freezing crust before the food ingredients are placed thereon, the combined effect of this feature and the feature discussed immediately hereinabove produces many advantages when compared to prior art frozen pizzas.

A further feature of this invention is to provide the protective, edible algin-containing film over the pizza to reduce breaking and splitting of the pizza thereby improving the transportability thereof. The film is effective to retard dehydration of both the pizza crust and the food ingredients during handling, storage and transporting. The film is also sufficient to retain flavors within the food ingredients during cooking of the pizza. With respect to storage, the film is sufficient to constitute an oxygen barrier for retarding oxidation to prevent ingredients that are highly susceptible to oxidation from becoming rancid. The film is also sufficient to effectively retard the scorching of the pizza including the dough and food ingredients when cooked by the consumer.

DESCRIPTION OF SPECIFIC EMBODIMENTS

The alginate coating composition for use in the process of this invention can be prepared by adding water-soluble algin to water. Any water-soluble algin that will gell with calcium salt, such as sodium, potassium and ammonium salts of alginic acid, may be used. Sodium alginate in its less degraded form, namely, the high viscosity grades, is generally used in the specific embodiments of this invention.

An edible filler material may be mixed with the algin. Examples of filler materials that have been used include carbohydrates comprising monosaccharides, polysaccharides and mixtures thereof. More specifically, dextrose, malto dextrin, sorbital or corn syrup solids may be used in this process. When using algin alone, the coating composition is prepared by adding water-soluble algin to pure drinking water at room temperature. The algin-containing films used in this invention include up to about 90% water at the time it is first formed and then with the water evaporating to a point below 30% by weight of the film. The thickness of the film varies. However, thicknesses of 1 to 2 mils have been found satisfactory.

The water-soluble algin is added to the water until the resulting composition has a viscosity in the range of 350 to 5,000 centipoises at room temperature. Filler materials may be used with the algin in an appropriate relationship from about 2½ to 20 parts by weight of the water-soluble algin to about 97½ to 80 parts by dry weight of the filler material. The mixture of algin and filler is then dissolved in a sufficient quantity of pure drinking water to produce an aqueous dispersion having a viscosity between 350 and 5,000 centipoises at room temperature.

The viscosity of the aqueous dispersion is dependent upon the particular conditions under which the dough product is being treated. The dough products used in these specific embodiments were pizzas. The aqueous dispersion is sprayed directly onto the surface of the pizza. The viscosity of the aqueous dispersion may vary. However, the dispersion should maintain a substantially uniform coating until the solidified continuous film is formed by contact with the gelling solution. If the viscosity is too high, the resulting coating will be too thick and gummy. This latter condition represents a waste of valuable material without producing any further beneficial effects. It is specifically desired that the substantially continuous alginate film is effective to produce the results unexpectedly achieved in accordance with this invention.

Once the aqueous dispersion containing algin is applied to the dough product, a gelling solution is then applied. The dough product may be sprayed with the gelling solution to partially cover the product or may be totally immersed if the entire product is to be covered. The aqueous gelling solution contains a water-soluble source of calcium ion such as calcium chloride, calcium gluconate, calcium acetate, calcium propionate, calcium lactate and the like. The aqueous gelling solution is applied for a period of time sufficient to form a substantially continuous film that adheres to the dough product surface. The film should be strong enough to prevent cracking and breaking during subsequent handling and shipping operations.

The stronger the concentrate of the calcium ion in solution, the quicker the alginate coating will be solidified and formed. For example, a suitable continuous film can be produced by using a 0.5 molar solution of calcium chloride being sprayed directly onto the aqueous dispersion that is uniformly disposed over the surface of the dough product surface. Gelling time is reduced also by adding an edible gum or gum-like thickening agent to the calcium ion gelling solution. The thickening agents are in quantities sufficient to give the gelling composition a Brookfield viscosity of between 5 and 250 centipoises and more specifically 5 to 100 centipoises at room tempertare. In accordance with this invention, a firm, strong alginate is formed almost instantaneously upon the application of the gelling solution to the aqueous dispersion.

A gelling solution used in a specific embodiment carried out in accordance with this invention includes the following composition:

carboxymethyl cellulose gum—29.5 grams
pure drinking water—3640.5 grams
calcium chloride—304.5 grams The carboxymethyl cellulose has a medium viscosity and bears product No. 7MCF from the Hercules Powder Company. The calcium chloride bears product No. 4152 and is designated food grade by Mallinckrodt Chemical Company. The above gelling solution has a viscosity of about 20 centipoises at room temperature.

In a specific embodiment of this invention, a fully processed frozen pizza including food ingredients such as tomato sauce and cheese was coated with an algin-containing coating in accordance with the described process of this invention. One half of the pizza was coated with the algin-containing coating and the other half of the pizza was left uncoated. The pizza was then cooked at the prescribed temperatures. In a totally unexpected manner, the coated portion of the pizza cooked without scorching. That is, the film was sufficient to effectively retard the scorching of the pizza during cooking. However, on the controlled side, or uncoated half of the pizza, scorching of the food ingredients and crust resulted under the precise same cooking conditions.

In another embodiment, a plain pizza crust was first coated with an algin-containing film on one side thereof. Subsequently, food ingredients were placed thereon and a second algin-containing film was formed thereover in accordance with the described process. The food ingredients included grated cheese, oregano, parsley and pepperoni. Airless spray guns were used to form both algin-containing films. The aqueous dispersion containing a water-soluble algin was first sprayed on the surface to be coated. Then, the gelling solution was sprayed over the algin-containing coating of the process.

The pizza crust bearing the food ingredients with the two separate algin-containing coatings were then conveyed through a blast or conveyor quick-freezing unit. The finely grated cheese, oregano, parsley and pepperoni were maintained in place. That is, the algin-containing film was sufficient to hold the food ingredients physically in place on the surface of the pizza crust while the pizza was subjected to the freezing step of the process. None of the food ingredients were blown off during the course of the freezing step. In addition, dehydration of the food ingredients was retarded due to the algin-containing coating.

The ingredients on the frozen pizza would not fall off during packaging, storage, or transportation. Furthermore, dehydration during the subsequent processing steps would also be retarded. The film is sufficient to constitute an oxygen barrier for retarding oxidation thereby preventing ingredients highly susceptible to oxidation, such as sausage, pepperoni, and anchovies, from becoming rancid. During cooking of the coated pizza, it was found that the protective film retained the flavors of the spices and seasonings and the food ingredients.

Pepperoni, which is a common ingredient of pizzas, has been cooked having a coating made in accordance with this invention disposed therearound. At the same time, uncoated pepperoni has been cooked. A visual comparison of the cooked specimens showed the uncoated pepperoni to be scorched. Further, flavor loss due to loss of moisture and seasoning was found in the uncoated pepperoni. On the other hand, the coated pepperoni was not scorched and maintained its moisture and seasoning. The same type of results were achieved when comparing coated and uncoated seasoned sausage meat which is a common food ingredient for pizzas. There was a marked difference in shrinkage, flavor retention, and browning for the sausage in the same manner as in the experiments with the pepperoni.

The spray solutions may be applied through nozzles disposed over a wire-mesh conveyor. Any overspray of the solutions may be easily recovered. The thickness of the film to be deposited may be controlled by the pressure in the spray guns, the exposure time, and the belt speed. These all have a bearing on the amount of thickness and consistency of the film desired. The formation of various types of film containing alginate is well known.

While the processing of dough product has been shown and described in detail, it is obvious that this invention is not to be considered as being limited to the exact form disclosed, and that changes in detail and construction may be made therein within the scope of the invention, without departing from the spirit thereof.

What is claimed is:

1. A method for processing a dough product comprising the steps of:
    a. preparing a pizza crust having a surface for receiving pizza food ingredients,
    b. applying a gel-forming effective amount of an aqueous dispersion of water-soluble algin to cover the food ingredient receiving surface of the pizza crust,
    c. applying an effective amount of an aqueous, calcium ion containing gelling solution to the algin-coated pizza crust for a period of time sufficient to form a substantially continuous edible algin-containing gelled film along this surface of the pizza crust, said film being sufficient to effectively retard the migration of material from food ingredients placed on the food ingredient receiving surface,
    d. placing pizza food ingredients on the food ingredient receiving surface,
    e. applying an effective amount of an aqueous dispersion of water-soluble algin over the food ingredients, and
    f. applying an effective amount of an aqueous gelling solution to the algin-coated food ingredients for a period of time sufficient to form a substantially continuous edible algin-containing film over the food ingredients and any exposed portion of the algin-coated crust, said film being sufficient to retard dehydration from said pizza crust and food ingredients, said film being effective to reduce breaking and splitting of the pizza to improve the transportability thereof, said film being sufficient to constitute an oxygen barrier for retarding oxidation to prevent ingredients highly susceptible to oxidation from becoming rancid, said film being sufficient to retain flavors within the pizza during cooking, said film being sufficient to hold the food ingredients physically in place on said one surface of the pizza crust while said crust is subjected to subsequent processing steps.

2. The method as defined in claim 1 wherein the gelling solution is prepared and applied separately from the algin-containing solution in each instance and immediately following said two aqueous dispersion applying steps.

3. The method as defined in claim 1 wherein the pizza crust preparing step includes precooking said crust, said film being applied to the food ingredient receiving surface after the precooking step, said film being sufficient to effectively retard the migration of material from food ingredients placed on the food ingredient receiving surface.

4. The method as defined in claim 1 wherein the algin-coated, ingredient bearing pizza crust is conveyed through a blast freezer to effect freezing thereof.

5. The method as defined in claim 1 wherein the algin-coated, ingredient bearing pizza crust is conveyed through a blast freezer to effect freezing thereof, said frozen pizza is packaged for storage and transportation.

6. The method as defined in claim 1 wherein the algin-containing film includes up to about 90% water at the time it is first formed and then with the water evaporating to a point below 30% by weight of the film.

7. The method as defined in claim 1 wherein there is sufficient amount of solids in the dispersion to provide the viscosity of from about 350 to 5,000 centipoises at room temperature.

8. The method as defined in claim 1 wherein the aqueous dispersion comprises a water-soluble algin and sorbital.

9. The method as defined in claim 1 wherein the aqueous dispersion comprises sodium alginate and malto dextrin in the respective portions of 2½ to 20 parts by dry weight of sodium alginate and 97½ to 80 parts by dry weight of malto dextrin.

10. The method as defined in claim 1 wherein the gelling material comprises calcium chloride and a gum thickener.

11. The method as defined in claim 1 wherein the gelling material comprises calcium chloride and carboxymethyl cellulose gum.

12. A method of preparing a dough product comprising the steps of:
    a. preparing a shaped pizza crust having a surface for receiving pizza food ingredients,
    b. preparing a gel-forming aqueous dispersion of a water soluble algin having a viscosity effective to substantially uniformly coat a surface of the pizza crust,
    c. applying an effective amount of the aqueous dispersion to cover the surface for receiving pizza food ingredients and
    d. separately applying an effective amount of an aqueous, calcium ion containing gelling solution to the algin-coated surface for a period of time sufficient to form a substantially continuous edible algin-containing gelled film along said surface, said film being effective to reduce breaking and splitting of the pizza crust dough product to improve the transportability thereof, said film being sufficient to effectively retard the scorching of the dough product during any subsequent cooking step.

13. A method as defined in claim 12 wherein
the pizza crust preparing step includes precooking the crust,
said film being applied to the pizza food ingredient receiving surface after the precooking step.

14. A method as defined in claim 12 wherein
said aqueous dispersion and said gelling solution being applied to the entire pizza crust to form said film over the entire surface of the pizza crust.

15. A method as defined in claim 12 wherein
a pizza crust preparing step includes placing pizza food ingredients on one surface thereof,
a first said algin-containing gelled film being applied to one surface of the pizza crust, said food ingredients being disposed on said first film-coated crust surface, and
a second said algin-containing gelled film is applied over the food ingredients disposed on said coated crust surface.

16. A method as defined in claim 12 wherein
the aqueous dispersion is sprayed onto said surface of the pizza crust.

17. A method of preparing a dough product comprising the steps of:
a. preparing a shaped pizza crust having a surface for receiving pizza food ingredients,
b. preparing a gel-forming aqueous dispersion of a water soluble algin having a viscosity effective to substantially uniformly coat a surface of the pizza crust,
c. spraying an effective amount of the aqueous dispersion to cover one surface of the pizza crust,
d. separately applying an effective amount of an aqueous, calcium ion containing gelling solution to the algin-coated surface for a period of time sufficient to form a first substantially edible algin-containing gelled film along said one surface,
e. placing pizza food ingredients on said first film-coated crust surface,
f. spraying an effective amount of the aqueous dispersion to cover the pizza food ingredients on said coated crust surface, and then
g. separately applying an effective amount of an aqueous gelling solution to the algin-coated ingredients for a period of time sufficient to form a second substantially continuous edible algin-containing film over said pizza food ingredients, said film being effective to reduce breaking and splitting of the pizza crust dough product to improve the transportability thereof, said film being sufficient to effectively retard the scorching of the dough product during any subsequent cooking step.

18. A method of preparing a dough product comprising the steps of:
a. preparing a shaped pizza crust having a surface for receiving pizza food ingredients,
b. preparing a gel-forming aqueous dispersion of a water soluble algin having a viscosity effective to substantially uniformly coat a surface of the pizza crust,
c. placing pizza food ingredients on said pizza crust surface for receiving said pizza food ingredients,
d. applying an effective amount of the aqueous dispersion to cover said pizza food ingredients,
e. separately applying an effective amount of an aqueous, calcium ion containing gelling solution to the algin-coated surface for a period of time sufficient to form a substantially continuous edible algin-containing gelled film over said food ingredients and crust, said film being effective to reduce breaking and splitting of the pizza crust dough product to improve the transportability thereof, said film being sufficient to effectively retard the scorching of the dough product during any subsequent cooking step.

19. A method of preparing a dough product comprising the steps of:
a. preparing a shaped pizza crust having a surface for receiving pizza food ingredients,
b. preparing a gel-forming aqueous dispersion of a water soluble algin having a viscosity effective to substantially uniformly coat a surface of the pizza crust,
c. applying an effective amount of the aqueous dispeersion to cover the surface for receiving pizza food ingredients, and
d. separately applying an effective amount of an aqueous, calcium ion containing gelling solution to the algin-coated surface for a period of time sufficient to form a substantially continuous edible algin-containing gelled film along said surface,
e. placing pizza food ingredients on said algin-coated food ingredient receiving surface,
f. applying an effective amount of the aqueous dispersion to cover the pizza food ingredients, and then
g. separately applying an effective amount of an aqueous gelling solution to the algin-coated ingredients for a period of time sufficient to form a substantially continuous edible algin-containing gelled film over the ingredients and any algin-containing film exposed on the pizza crust, said film between the pizza food ingredients and the food ingredient receiving surface being sufficient to effectively retard the migration of material from the food ingredients placed thereon, said film being effective to reduce breaking and splitting of the pizza crust dough product to improve the transportability thereof, said film being sufficient to effectively retard the scorching of the dough product during any subsequent cooking step.

* * * * *